Jan. 14, 1969   C. T. WALTERS   3,421,701
CONTROLLED PATTERN SPRAYING NOZZLE
Filed April 25, 1967
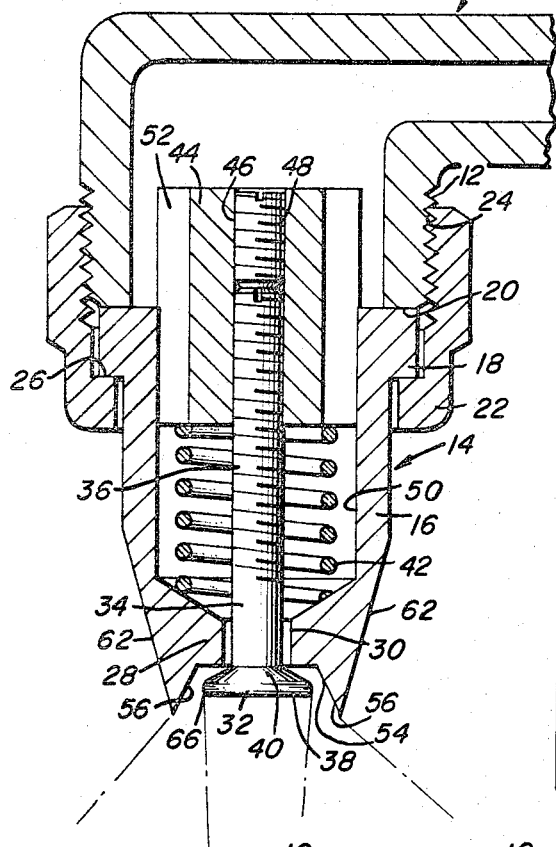
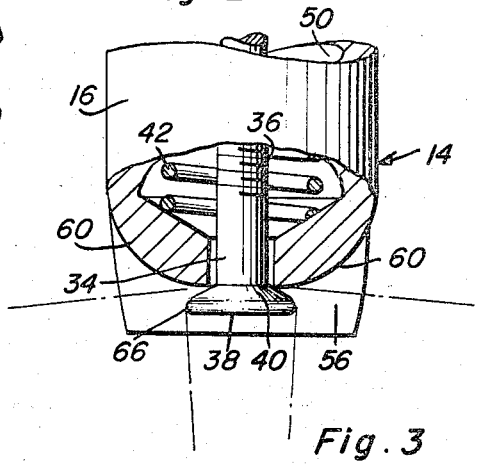
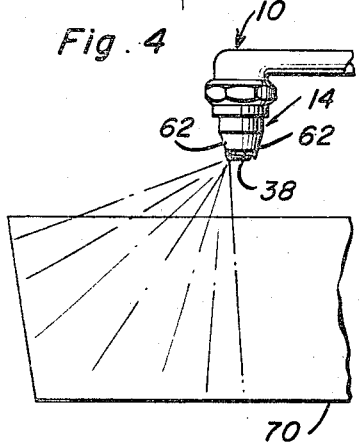
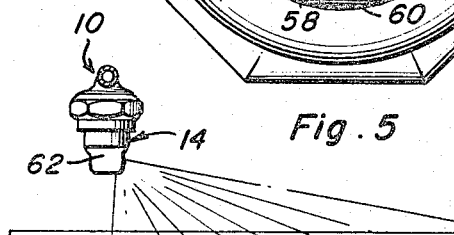
Clayton T. Walters
INVENTOR.

United States Patent Office 3,421,701
Patented Jan. 14, 1969

3,421,701
CONTROLLED PATTERN SPRAYING NOZZLE
Clayton T. Walters, Corpus Christi, Tex., assignor to Clayton Specialties, Inc., a corporation of Texas
Filed Apr. 25, 1967, Ser. No. 633,586
U.S. Cl. 239—453  9 Claims
Int. Cl. B05b 1/32; B05b 1/02

ABSTRACT OF THE DISCLOSURE

A spraying nozzle to be used primarily for greasing or oiling bread loaf pans and including specifically formed outlet nozzle tip portions which, because of their configuration, enable nozzles constructed in accordance with the present invention to evenly spray oil over all inner surface portions of a rectangular bread pan.

---

The controlled pattern liquid spraying nozzle of the instant invention is designed to control the spraying pattern and to limit the deposit of fluids to a predetermined area. A spraying nozzle capable of spraying fluids throughout a predetermined area or pattern adapts the nozzle to many uses including greasing or oiling bread loaf pans in bakery production. Such pans are of various sizes and are usually rectangular in shape. Heretofore it has not been possible to completely coat the inner surface portions of the sides, ends and bottoms of such pans with bakery oiling equipment presently used, especially if the spraying of oil is to be substantially entirely confined to the inner surface portions of the pans to be greased. It is of course imperative that the inner surface portion of bread pans be coated with oil to prevent the loaves from sticking to the pans.

Although a plurality of nozzles of smaller size and of conventional design may be grouped together in one location and simultaneously used so as to spray substantially all of the internal surface portions of a bread pan, the use of such a plurality of nozzles having a conventional circular spray pattern results in some portions of the pans being sprayed receiving more oil than other portions and thus necessitates that the portions of the pans receiving the greater amounts of oil be coated with a heavier layer of oil to insure that the portions of the pan receiving the lesser amounts of oil receive at least the minimum coating of oil required. This of course results in not only uneven oiling of the bread pans but also greater amounts of oil being used. Further, when a plurality of smaller spraying nozzles are used, there is a considerably greater chance of nozzle failure due to clogging and certain operational problems arise such as ensuring that the correct amount of oil is delivered to each nozzle at exactly the right pressure.

Accordingly, it is the main object of this invention to provide a controlled pattern fluid spraying nozzle whereby a single nozzle may be utilized to spray each bakery pan to be coated with oil.

Another very important object of this invention, in accordance with the immediately preceding object, is to provide a spraying nozzle including automatic valve means operative to open automatically as soon as the correct line pressure to the nozzle is achieved. In this manner, relatively simplified controls may be provided for the fluid handling system by which oil under pressure is supplied to the spraying nozzle.

Yet another object of this invention is to provide a controlled pattern fluid spraying nozzle including structural features thereof which may be varied slightly in configuration so as to vary the size and shape of the spray pattern to be realized.

A final object of this invention to be specifically enumerated herein is to provide a controlled pattern fluid spraying nozzle which will conform to conventional forms of manufacture, be of simple construction and automatic in operation so as to provide a device that will be economically feasible, long lasting and relatively trouble-free in operation.

These together with objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary vertical sectional view taken substantially upon a plane passing through the center line of the discharge end portion of an oil supply line from which a spraying nozzle constructed in accordance with the present invention is supported;

FIGURE 2 is a side elevational view of the lower end portion of the spraying nozzle as seen from the left side of FIGURE 1 and with the adjacent half of the lower end of the spraying nozzle being broken away and illustrated in vertical section;

FIGURE 3 is a bottom plan view of the spraying nozzle;

FIGURE 4 is an elevational view of the spraying nozzle illustrating the manner in which one side of the nozzle is operative to spray one half of the bottom of a bread pan disposed therebeneath as well as the corresponding side wall of the bread pan; and FIGURE 5 is a further elevational view of the spraying nozzle illustrating the manner in which one half of the spraying nozzle is operative to spray one half the length of the bottom of a bread pan and the adjacent end wall of the bread pan.

Referring now more specifically to the drawings the numeral 10 generally designates the outlet end portion of an oil supply line to which oil under pressure may be delivered by any suitable means. The outlet end portion of the oil supply line 10 includes an externally threaded angulated neck portion 12 which opens downwardly and supports the spraying nozzle of the instant invention, the latter being generally designated by the reference numeral 14.

The nozzle 14 includes a tubular body 16 provided with a radially outwardly projecting and circumferentially extending shoulder 18 on one end. The end of the body 16 upon which the shoulder 18 is carried abuts the lower end face 20 of the neck portion 12 and a connector sleeve 22 is disposed about the body 16 and is internally threaded as at 24 for threaded engagement with the externally threaded neck portion 12 so as to securely mount the body 16 on the free end of the neck portion 12. Of course, the connector sleeve 22 includes a radially inwardly projecting and circumferentially extending shoulder 26 on its end remote from the internally threaded end portion thereof which abuts against the radial surface portion of the shoulder 18 remote from the neck portion 12. Therefore, it may be seen that the opposing end faces of the neck portion 12 and body 16 are urged into fluid-tight sealed engagement with each other.

The end of the tubular body 16 remote from the shoulder 18 includes an annular end wall 28 defining a bore 30 extending axially therethrough.

An elongated valve member 32 is provided and includes an elongated shank 34 externally threaded as at 36 on one end portion and provided with a diametrically enlarged valve head 38 on its other end portion. The portion of the shank 34 immediately adjacent the valve head 38 extends through the bore 30 and the valve head 38 includes a conical seating surface 40 facing the end wall 28 and seatingly engageable with the portions of the latter defining the outer end of the bore 30 so as to close the latter. The angle of the conical seating surface 40 relative to a plan normal to the longitudinal centerline of the shank 34 is predetermined as will hereinafter be more fully set forth.

A relatively strong compression spring 42 is disposed within the body 16 and has one end thereof abutted against the inner surface of the end wall 28. An adjusting sleeve 44 is threaded on the end of the shank 36 remote from the head 38 and which projects through the spring 42 and the end of the spring 42 remote from the end wall 28 abuts against the opposing end wall of the adjusting sleeve 44. The threaded bore 46 formed through the sleeve 44 is considerably longer than the portion of the shank 34 threaded into the bore 46 and a locking plug 48 is threaded into the end of the bore 46 remote from the spring 42 in tight jammed engagement with the adjacent end of the shank 34 so as to prevent rotation of the shank 34 relative to the sleeve 44. Further, the sleeve 44 is snugly received within the counterbore 50 formed through the upper end portion of the body 16 above the end wall 28 and the sleeve 44 includes diametrically opposite longitudinally extending and radially outwardly opening grooves 52 defining passages for oil to move past the sleeve 44 from the neck portion 12 into the counterbore 50.

The lower or outlet end of the body 16 has a diametric and downwardly opening groove 54 formed therein including longitudinally straight and downwardly divergent opposite side walls 56 and a downwardly facing bottom wall 58 through whose center portion the lower end of the bore 30 opens.

The bottom wall 58 is of a width considerably greater than the diameter of the bore 30 and slightly greater than the diameter of the head 38. In addition, the opposite ends of the bottom wall 58, a spaced distance from corresponding sides of the outlet end of the bore 30, curve smoothly upwardly as at 60 and the outer side surface portions 62 of the body 16 disposed on opposite sides of the groove or channel 54 are planar and downwardly convergent. The outer side surface portions 62 generally parallel the longitudinal centerline of the grooves 54 and intersect with the lower edge portions of the corresponding side walls 56 with a sharp corner being defined at the intersections of the side walls 56 and the corresponding outer surface portions 62 which is appreciably greater than 90 degrees.

The nozzle 14 is automatic in operation in that as oil under pressure is delivered thereto through the neck portion 12 the spring 42 will maintain the valve member 32 in its furthermost upwardly displaced position with the conical seating surface 40 of the valve head 38 in fluid-tight sealed engagement with the portions of the end wall 28 defining the discharge end of the bore 30. Of course, the tension on the compression spring 42 may be adjusted by loosening the locking plug 48, rotating the sleeve 44 relative to the shank 34 and then again locking the plug 48 against the adjacent end of the shank 34. As the proper predetermined line pressure within the bore 16 is reached, the pressure of the oil acting upon the valve head 38 will cause the latter to be downwardly displaced and thus the discharge end of the bore 30 to be opened whereupon oil from within the bore 16 will be forced outwardly of the bore 30 about the head 38 at a rapid rate.

According to the angle at which the side walls 56 are disposed relative to verticle planes, the angle of the seating surface 40 relative to a plan normal to the centerline of the shank 34, the radius of curvature of the end portions 60 of the bottom wall 58 and the radius of curvature at the outer periphery 66 of the valve head 38, the desired rectangular pattern of spray will be affected by the nozzle 14.

As the velocity of flow of a fluid across the surface is increased, the pressure on that surface decreases whereby the fluid tends to continue along the surface whether it be planar or curved. Inasmuch as the outer periphery of the valve head 38 is rounded, the oil being discharged from the bore 30 and moving downwardly across the seating surface 40 has a tendency to flow around the curved peripheral edge portions of the valve head 38. This of course results in a portion of the oil being discharged from the bore 30 being directed slightly inwardly but almost straight downwardly from the outer peripheral portions of the valve head 38. Of course, some of the oil moving downwardly along the seating surface 40 abuts and moves downwardly along the side walls 56. However, the sharp corner at the lower ends of the side walls 56 affected by the downwardly divergent side walls 56 and the downwardly convergent outer side surface portions 62 presents a curved surface or corner which is too sharp for the discharged oil to flow around at high velocity and therefore the oil is only slightly outwardly deflected as it leaves the lower edge portions of the side walls 56. Of course, the side walls 56 extend along only opposite sides of the groove or channel 54 and the open ends of the channel 54 allow the oil being discharged from the nozzle 14 to be directed outwardly from opposite ends of the groove 54 in almost horizontal directions. Therefore, it may be seen that the oil being discharged from the opposite ends of the groove 54 is adapted to oil the inner surfaces of the opposite end portions of an elongated pan centered beneath the nozzle 14. Therefore, from a comparison of FIGS. 1, 2, 4 and 5 it may be seen that a single nozzle 14 may effect a spraying pattern of oil to coat all of the inner surfaces of an elongated generally rectangular shaped bread pan disposed therebeneath and that very little of the oil being sprayed, if any, is deposited outwardly of the pan 70. If the pan to be sprayed is very short the planar center portion of the bottom wall 58 extends only slightly beyond opposite sides of the outlet end of the bore 30 in the direction in which the groove 54 extends and the radius of curvature of the curved end portions 60 of the bottom wall 58 is made larger. For a long pan the planar center portion of the bottom wall 58 is made longer and the curved end portions 60 of the bottom wall 58 have a smaller radius of curvature. Of course, the width of the groove 54, the inclination of the side walls 56 and the inclination of the outer side surface portions 62 may also be varied in accordance to the width of the pan 70 to be sprayed. In any event, the nozzle 14 may be readily modified so as to evenly spray the internal surfaces of a rectangular bread pan of substantially any dimensions commonly used.

What is claimed as new is as follows:

1. A controlled pattern spraying nozzle, said nozzle including a body having a spray outlet opening formed therein and a fluid inlet opening adapted to be communicated with a sutiable source of fluid under pressure, said body including an outwardly opening elongated channel formed therein including opposite side walls and a bottom wall, said outlet opening opening outwardly through the central portion of said bottom wall with the center line of said opening disposed generally normal to the plane in which the central portion of the bottom wall is disposed, a valve member including a stem loosely slidable through said outlet opening and having a valve head on its outer end including liquid discharge dispersion and seating surfaces opposing said bottom wall and seatable in the outlet end of said outlet opening, said dispersion and seating surfaces including means operative to form a generally conical spray of liquid discharged under pressure from said outlet opening extending generally normal to said central portion, said walls including surface portions operable to act upon said conical spray to shorten the spray along a first axis extending normal to said center axis and lengthen the spray along a second axis disposed normal to said center axis and said first axis.

2. The combination of claim 1 wherein said second axis generally parallels said channel.

3. The combination of claim 1 wherein the opposite end portions of said bottom wall curve smoothly away from the direction in which said channel opens outwardly.

4. The combination of claim 1 wherein said side walls are outwardly divergent.

5. The combination of claim 4 wherein the opposite end portions of said bottom wall curve smoothly away from the direction in which said channel opens outwardly.

6. The combination of claim 1 wherein said side walls are outwardly divergent, the outer longitudinal edge portions of said side walls terminating along the corresponding marginal edge portions of the outer surfaces of said body and defining sharp corner edges therewith, said side walls and marginal edge portions forming acute included angles of less than sixty degrees.

7. The combination of claim 6 wherein the opposite end portions of said bottom wall curve smoothly away from the direction in which said channel opens outwardly.

8. The combination of claim 1 wherein said marginal edge portions are convergent in the direction in which said channel opens outwardly.

9. The combination of claim 1 including adjustable means operatively connected between said body and said valve member yieldingly urging said valve member toward a position with said liquid discharged dispersion and seating surfaces seated in the end of said outlet opening.

References Cited

UNITED STATES PATENTS

| | | | |
|---|---|---|---|
| 919,737 | 4/1909 | Loomis et al. | 239—518 |
| 2,585,100 | 2/1952 | Falcon | 239—453 |
| 2,745,701 | 5/1956 | Wahlin | 239—597 |
| 3,093,317 | 6/1963 | Simmons et al. | 239—453 |
| 3,246,625 | 4/1966 | Beaman | 239—453 |

EVERETT W. KIRBY, *Primary Examiner.*

U.S. Cl. X.R.

118—254, 317